March 14, 1961
G. MEDIANO CAPDEVILA
2,974,365
REVOLVING LAST CARRIER HEAD FOR FOOTWEAR VULCANIZING MACHINES
Filed Oct. 14, 1957
2 Sheets-Sheet 1
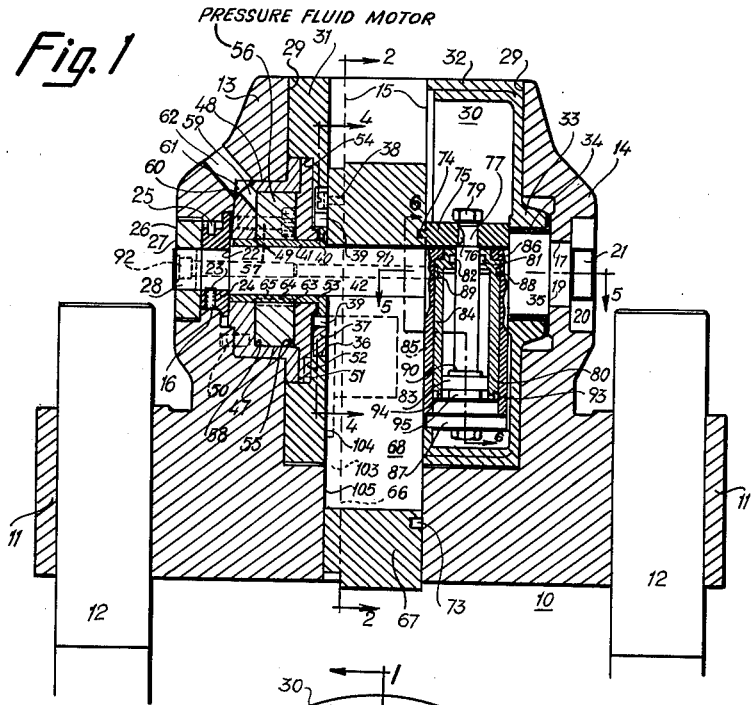
GONZALO MEDIANO CAPDEVILA
INVENTOR.
BY
Wenderoth, Lind & Ponack
Attys March 14, 1961  G. MEDIANO CAPDEVILA  2,974,365
REVOLVING LAST CARRIER HEAD FOR FOOTWEAR VULCANIZING MACHINES
Filed Oct. 14, 1957
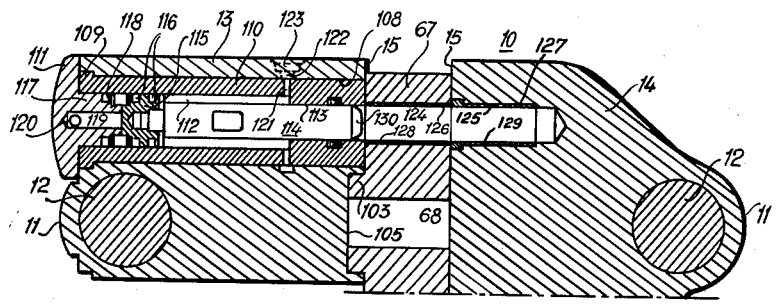
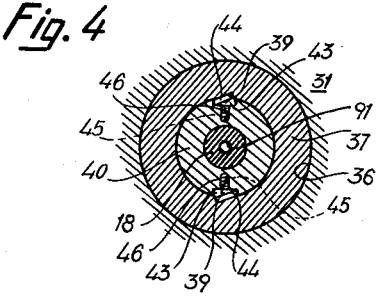
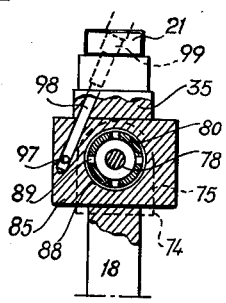
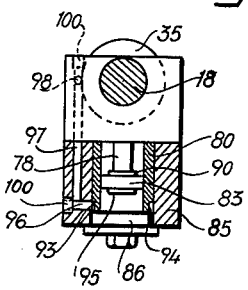
GONZALO MEDIANO CAPDEVILA
*INVENTOR.*
BY
Wenderoth, Lind & Ponack
Attys United States Patent Office 2,974,365
Patented Mar. 14, 1961

2,974,365

REVOLVING LAST CARRIER HEAD FOR FOOT-
WEAR VULCANIZING MACHINES

Gonzalo Mediano Capdevila, 12 Pasaje Gayola,
Barcelona, Spain

Filed Oct. 14, 1957, Ser. No. 689,948

Claims priority, application Spain Oct. 22, 1956

8 Claims. (Cl. 18—17)

The present invention relates to a revolving last-carrier head for footwear vulcanizing machines and the object thereof is to provide a device of the kind referred to by means of which the fast substitution of a last whereon a footwear article has been vulcanized by another last disposed for the vulcanization of another article can be effected automatically and within the proper machine working cycle, so that the said substitution operations do not cause dead times within the manufacturing process.

According to the invention the last-carrier comprises a supporting bridge mounted on the machine and provided with a revolving member which carries pairs of lasts in diametrally opposite positions, and means to revolve the rotatable member between positions in everyone of which at least one of the lasts is opposed to a respective footwear article vulcanizing mold.

Other and further objects of the invention will result from the following detailed discussion of a preferred embodiment of the invention cited only by way of example with reference to the accompanying drawings in which Fig. 1 is a section on the line 1—1 of Fig. 2;
Fig. 2 is a section on the line 2—2 of Fig. 1;
Fig. 3 is a section on the line 3—3 of Fig. 2;
Fig. 4 is a section on the line 4—4 of Fig. 1;
Fig. 5 is a section on the line 5—5 of Fig. 1, and
Fig. 6 is a section on the line 6—6 of Fig. 1.

According to the drawings the last-carrier comprises a general body 10 formed with lateral projections 11 in which respective parallel, vertically directed bores have been formed to receive the ends of the columns 12 of a vulcanizing machine, for example of the type described in previous patents of the applicant.

The body 10 is formed by two parts 13, 14 extending to the center of the machine and terminating in two opposed surfaces 15 in laterally spaced relation. In order to define the alignment of these parts, they are formed with respective bores 16, 17 wherein the axle 18 is secured: it is secured at one end in the bore 17 by means of the stepped diameters 19 and the nut 20 which engages with its threaded tenon 21, and it is secured at the other end in the bore 16 by means of the step 22 in which tenon a ring 24 provided with a tenon 25 protruding radially and engaging with a key-way 26 formed in the bore, is fixed in a non-rotatable manner as regards the axle by means of the screw 23. The nut 27 threaded on the threaded end 28 fastens these members so that the axle 18 is made stationary both axially and circumferentially. On the other hand, as will be understood from the following description, the parts mounted between the members 13, 14 contribute rigidity to the ensemble although they can move between the same in a respective manner.

The opposed surfaces of the parts 13, 14 are provided with respective cylindrical housings 29 coaxial with the axle 18, wherein the revolving body 30 is received. The revolving body is constituted by two cylindrical pieces 31, 32 coupled to one another so that they form a cylinder extending between the bottoms of the described housings 29, so that they completely fill the space defined therebetween, and with their wide cross section serve as a fulcrum for the said bottoms against any deflection tendency of the ensemble. If when this cylindrical member is to be rotated and the ensemble is subjected to any deflection load this is not objectionable for the operation of the machine.

The part 32 has a cup shape with its concavity directed toward the center of the machine. The bottom of this part has a pin 33 formed with a bearing sleeve 34 resting on the pin 35 of the axle 18.

Part 31 is a plate formed with a wide opening 36 wherein a circular crown 37 is secured by means of the screws 38. This crown has two diametrally opposite notches 39 in its inner periphery which are formed with a ratchet tooth contour as it will be seen from the Fig. 4. Within the opening of the said crown the flange 40 formed at the inner end of the sleeve 41 can rotate, the sleeve also being adapted to rotate freely about the pin 42 of the axle 18. The periphery of this flange has two diametrally spaced notches 43, each having a housing suitable for receiving ratchet 44 when they are not opposite the notches of the crown 37, and an edge, opposite to the retaining edge of the said notches 39, of suitable inclination for retaining the ratchets. The springs 45 mounted between the ratchets and holes 46 formed in the flange 40, tend to maintain the ratchets in the illustrated position, thereby providing a free-wheeling effect which appears from the mere examination of the Fig. 4.

The bottom 29 of the cylindrical housing formed in the part 13 has a cylindrical cavity 47 coaxial with the axle 18 wherein the pressure fluid motor to be described is mounted. The motor is an oscillating vane type motor and is constituted by a cylindrical cup-shaped box 48 having its bottom directed towards the outer end of the axle 18 and the cavity thereof towards the center of the machine. This box has an axial hole 49 fitted with the sleeve 41 so that a relative rotation movement can take place between both elements, and the box is prevented from revolving by the longitudinally extending tenon 50 which engages aligned holes formed in the bottom of the cavity 47 and the bottom wall of the box 48. The mouth of the box is provided of a flange 51 extending radially outwardly and has coupled thereto in a fluid-tight manner a lid 52 provided with an axial hole 53 fitting on the sleeve 41 so that a fluid-tight closure is obtained and permitting the rotation thereof. The flange 51 and the outer edge of the lid 52 are received in a recess 54 formed around the opening 36 in part 31, so that the box and the lid are held against axial movement between the members 13 and 31.

The cavity 55 of the box for the motor is cylindrical and has secured therein a circular crown sector 56 by means of the screws 57 threaded into holes formed to this end in the bottom wall of the box. This sector fits in a fluid tight manner with the inner surface of the bottom and lateral wall of the box, with the inner surface of the lid and with the outer surface of the sleeve 41 so that the rotation of the latter is permitted. The angular amplitude of this sector is 90°, so that an identical sector 58 freely slidable within the remainder of the cavity of the box 48 can rotate freely until abutting against either of the two ends of the fixed sector 56, thereby moving along a circular path of 180°. To effect this motion the box 48 has two slanted holes 59, only one of them being visible in the Figure 1, each said holes extending into the box in positions adjacent the ends of the stationary sector 56 and at the outside of the box in respective flats 60 against which a conventional connection threaded into an inner thread 61 formed in the said holes, can be applied to constitute a fluid tight seal. These elements are aligned with a wide opening 62 formed in the part 13, through which a pressure fluid feeder tube (not shown) adapted to be connected with a suitable source, can protrude to the outside.

From the description it will be understood that by supplying pressure to one of the ends of the cavity, the free sector will be displaced towards the other end and vice versa. However, the free sector has a key-way 63 in the surface thereof contacting the surface of the sleeve 41 which in turn has a corresponding key-way 64. In both key-ways fits a key 65 so that the free sector is connected to rotate with the sleeve, so that if the sector is operated by the pressure fluid to revolve counter clockwise looking from the left of the Fig. 1, the sleeve is drawn by this sector and the flange 40 thereof revolves thereby causing the ratchets 44 to depart from the notches 43 in the crown 37. When the sector comes to the end of its traverse, in contact with the other end of the fixed sector 56, the ensemble has performed a rotation of 180°, i.e. the ratchets again engage the notches in the crown 37 but in an inverted position relation. Now, if the movable sector is operated clockwise the flange 40 will push the ratchets 44 against the opposite flanks of the notches 39 in the crown 37 thereby including the latter in its rotation, i.e. the ensemble of the revolving body formed of the two parts 31, 32 will be displaced of 180° and remain in this position until the movable sector is operated again after having recoiled as previously described.

The part 31 is provided, in its surface of engagement with the member 32, with a wide diametral milling 66 of a substantially rectangular cross section so that, together with the member 32 it defines a box wherein the walls which are laterally spaced as regards the machine coincide with the opposed surfaces of the pieces 13, 14. A slide 67 is slidably mounted in this box or slideway, and is provided with a longitudinal cut 68 through which the axle 18 passes and openings 69 at the ends thereof wherein the fastening bolts 71 for the mounting plate 72 joined to a conventional last (not shown), can be secured by means of the tapered point screws 70. From the above, it will be understood that two lasts, mounted in the described manner, at both ends of the slide 67, can work in the machine so that the one is in vulcanizing position while the other remains spaced from the machine in a location suitable to allow the substitution of the footwear article. Thereafter, upon rotation of the ensemble in the manner indicated the relative position of the lasts is inverted and so on.

If, instead of two lasts, four lasts are disposed mounted in the revolving body, spaced at intervals of 90° from each other, and if the angular displacement of this body is reduced to one half, then two vulcanization stations and two substitution stations can be obtained. In the same manner, by constructive variations which will pose no difficulty for the expert, the number of lasts can be varied according to the requirements.

The lasts can be mounted parallel to the axle 18 or, otherwise, transversely thereto with the toes directed in the same circumferential direction.

In the first case it is necessary to provide devices to move the lasts towards the vulcanizing devices once opposite the latter, or to displace these vulcanizing devices towards the last, so that the latter can freely effect its rotation movement.

In the case of placing the lasts transversely to the axle 18, particularly when the mechanism is used in conjunction with vulcanizing machines comprising two movable jaws forming the only laterally movable parts and these parts can be separated a sufficient distance laterally of the vulcanizing mold, it is not at all necessary that the last be provided with the described approach movement to the vulcanizing station, although the approaching mechanism described hereafter can be used in both cases.

The surface of the slide 67 next to the member 32 is formed with a circular groove 73 centered midway of the length of the slide and wherein a circular sector shaped rib 74 is slidably fitted, the rib forming part or being secured to the lifting member 75. This is keyed by means of the key 76 on the tenon 77 on the upper end of the piston rod 78 and secured in position on this rod by means of the nut 79 engaging a correspondingly threaded part of the end of the said rod. The rod extends into the cylinder 80 through an opening 81 formed at the bottom of the cylinder and provided with a corresponding joint 82 to provide a fluid tight seal, the rod being provided with a piston 83 which moves within the said cylinder and can be operated from both sides thereof.

The cylinder is mounted through the lower opening of a bore 84 in a part 85 depending from the axle 18 and integral with the latter. The upper opening of this bore has an inwardly directed flange 86 with which a corresponding recess formed at the upper end of the cylinder engages when the cylinder is pressed upwardly by screwing the plug 87 in a thread formed at the lower end of the bore 86.

The upper end of the cylinder has a peripheral groove 88 and radial holes 89 connecting the bottom of the groove with the cylinder above the piston, to which end the piston is provided with a stop collar 90 restricting the upwards displacement of the ensemble to prevent the holes 89 from being closed by the piston. A hole 91 extending longitudinally to the left end of the axle 18 meets the groove 88 and at the end of the axle terminates in a threaded mouth 92 to which may be connected a pressure fluid conductor tube not shown.

The lower end of the cylinder has a recess 93 at the outer edge thereof and has notches 94 defining passages between the said recess and the cylinder below the piston, the latter being provided with a stop 95 on the bottom face thereof to prevent total closing of the said passages. A conduit for the passage of pressure fluid meets the said groove or recess and is extending by the drill hole 96 formed laterally in the part 85 (see Figs. 5 and 6); drill hole 97 extending from the hole 96 to the upper end of the said part, and drill hole 98 which, from the upper part of the previous drill hole, extends to the right end of the axle 18 and terminates in a threaded connection 99 to which can be connected to another pressure fluid conductor tube. Of course, the machining ends of these conduits are closed by means of plugs 100.

From the foregoing it will be seen that the slide 67 and the members associated therewith can be lifted from the position illustrated in the figures when pressure fluid, for instance oil, is injected through the conduits 98, 97 and 96 in order to raise the piston 83 which, by means of the member 75, raises the slide 67. The upwards traverse of this piston corresponds to the offsetting of the groove 73 as regards the axle 18, so that when the described members reach their upper position the groove is centered about the axle and ready to revolve when the motor 48 is operated to reverse the relative positions of the lasts. Upon completion of the reversing operation, oil can be injected at the upper part of the cylinder to return the slide to the position illustrated in the figures, wherein a last joined to its lower end is moved against the molding devices of the machine, and the last remaining in the upper part is ready to be provided with a new upper or another footwear article to be vulcanized, or for the extraction of a completed article.

The lateral wall 101 of the slide 67 slide against corresponding walls 102 of the member 31, so that the movable elements are rather well guided. However, in order to ensure the exact displacement of the last toward the vulcanizing members, the slide wall opposite to the groove 73 has a longitudinal rib 103 fitting in a slide way 104 formed in the adjacent face of the part 31. The lower portion of the part 13 has, aligned with the guide 104 when the slide is in vertical position, another slideway 105 terminating in an end having walls tapering inwardly and downwardly as indicated at 106, against which the chamfered ends 107 of the rib 103 rest every time the slide moves downwardly to its lowest position.

It may be that, in special applications, the force of the lifting cylinder 80 is sufficient to resist the upward force of the vulcanizing process, but if this is not the case a slide locking device such as that described in connection with Figs. 2 and 3, can be used.

The member 13 has at its lower portion and at either side of the corresponding column 12 a bore 108 parallel to the axle 18 and extending from end to end and provided with a widened step 109 at its outer end. Within this bore fits a cylinder 110 fastened in position by means of the cap 111 screwed by any suitable means to the body 13. This cylinder has a bore 112 open at its outer end but narrowed at the opposite end thereby forming the guide 113 wherein the piston rod 114 can slide. This piston rod has threaded on the inner end thereof the piston 115 provided with the corresponding joints 116. The cap 111 has a central protrusion 117 on its inner side, likewise provided with a joint collar 118 which bears against the inner surface of the cylinder acting as a closing joint. In this protrusion is the longitudinal conduit 119 connected with the conduit 120 which extends to the outside of the cap where it is provided with the corresponding coupling devices for a suitable connection tube. At the bottom of the cylinder there are radial holes 121 leading, from the inside, into a peripheral groove 122, and the body 13 has a conduit 123 opening into the said groove and provided with a thread to receive another tube connection.

From the above it will be seen that on applying pressure fluid to the one or the other end of the cylinder, the piston with its rod will be pushed in one or the other direction.

When the revolving member 30 is at one of its limit diametral positions and the slide is at its lower position, the hole 124 provided in the slide registers with the rod 114 so that the rod, upon being displaced towards the right of the figure, can pass through it into the hole 125 formed in the body 14 and aligned with the cylinder. In order to avoid excessive wear of these parts as a consequence of the friction with the rod 114, the said holes have bushings 126, 127 housed in the corresponding housings 128, 129. Furthermore, the rod 114 ends in a tapered point 130 which will facilitate the entrance of the rod into the holes in case of misalignment of these elements.

It will be understood that this device can be operated by feeding pressure fluid to the various hydraulic motors described, at suitable moments which can be effected by means of any conventional valve combination operated manually or by means of sequential feeding distributor devices, for example that described in another patent of the applicant.

It is obvious, of course, that some variations, such as size and shape as well as suitable materials can be effected in the present invention without departing from the scope thereof as defined in the appended claims.

I claim:

1. A revolving last carrier head for fixed attachment to a footwear vulcanizing machine, comprising a body having two spaced projections thereon, an axle fixed to said projections and extending between them, a revolving body rotatably mounted on said axle and constituted by two cylindrical pieces abutting each other, the abutting faces of said cylindrical pieces each having at least one groove therein, the grooves being opposed and defining at least one slideway, said body having an extension of said slideway therein extending toward the vulcanizing position of said machine, a slide for carrying a last slidably mounted in said slideway, one of said cylindrical pieces having a recess therein elongated in the direction of said slideway, hydraulic means therein connected to said slide for reciprocating said slide along said slideway, the other of said cylindrical pieces having a recess therein, hydraulic means in said recess connected to said revolving body for rotating said revolving body through a predetermined angle, and hydraulic locking means in said body for locking said slide in position with said slide in the extension of said slideway.

2. A revolving last carrier head for fixed attachment to a footwear vulcanizing machine, comprising a body having two spaced projections thereon, an axle fixed to said projections and extending between them, a revolving body rotatably mounted on said axle and constituted by two cylindrical pieces abutting each other, the abutting faces of said cylindrical pieces each having a groove therein, the grooves being opposed and defining a slideway, said body having an extension of said slideway therein extending toward the vulcanizing position of said machine, a slide for carrying a last on each end thereof slidably mounted in said slideway, one of said cylindrical pieces having a recess therein alongated in the direction of said slideway, hydraulic means therein connected to said slide for reciprocating said slide along said slideway, the other of said cylindrical pieces having a recess therein, hydraulic means in said recess connected to said revolving body for rotating said revolving body through a predetermined angle, and hydraulic locking means in said body for locking said slide in position with said slide in the extension of said slideway.

3. A revolving last carrier head as claimed in claim 2 in which said body is in two parts, one projection being on each part, and said axle holds said parts, said cylindrical pieces and said slide against each other with a force sufficient to resist bending stresses in said carrier head transverse to the length of said axle.

4. A revolving last carrier head as claimed in claim 2 in which said locking means comprises at least one hydraulically operated piston rod, said body having holes therein aligned with each other in which said piston rod is slidable, said slide having a hole therein which is aligned with the holes in said body when said slide is in the extension of said slideway.

5. A revolving last carrier head as claimed in claim 2 in which said hydraulic means for rotating said revolving body comprise a revolving vane motor having a fixed annular chamber, a fixed sector in said annular chamber, a movable vane in said annular chamber, hydraulic connections for said annular chamber at each end of said fixed sector, and a pawl clutch connected between said movable vane and said revolving body.

6. A revolving last head as claimed in claim 2 in which said slideway extends diametrically of said revolving body and said slide has an elongated aperture therethrough which said axle passes.

7. A revolving last head as claimed in claim 2 in which the ends of said slideway extension are chamfered inwardly and the end of said slide is correspondingly chamfered, and said slideway has a groove in one wall thereof, and a rib on said slide slidable in said groove.

8. A revolving last head as claimed in claim 2 in which the connection between said hydraulic means for reciprocating said slide and said slide comprise a rib on said hydraulic means, said rib being shaped as a sector of a circle, and said slide having a circular groove therein in which said rib is slidable, said circular groove being concentric to said axle when said slide is in the position in which a last thereon is withdrawn from the vulcanizing position.

References Cited in the file of this patent

FOREIGN PATENTS

| 202,676 | Australia | July 25, 1956 |
| 1,107,098 | France | Aug. 3, 1955 |